United States Patent [19]

Takai

[11] Patent Number: 5,383,117
[45] Date of Patent: Jan. 17, 1995

[54] PROGRAMMABLE CONTROLLER AND CONTROL METHOD THEREOF

[75] Inventor: Shigeharu Takai, Aichi, Japan

[73] Assignee: Mitsubishi Denki Kabushiki Kaisha, Tokyo, Japan

[21] Appl. No.: 35,412

[22] Filed: Mar. 23, 1993

[30] Foreign Application Priority Data

Jun. 26, 1992 [JP] Japan .................... 4-168706

[51] Int. Cl.⁶ .............................................. G06F 15/46
[52] U.S. Cl. ...................................... 364/141; 364/192
[58] Field of Search ................. 364/140, 141, 191–193, 364/147

[56] References Cited

U.S. PATENT DOCUMENTS 4,254,460  3/1981  Achter et al. .................... 364/141
4,700,326 10/1987  Florine ............................. 364/140
4,748,552  5/1988  Seino ............................... 364/140
5,189,604  2/1993  Lovrenich ....................... 364/141

FOREIGN PATENT DOCUMENTS 2-45803  2/1990  Japan .

Primary Examiner—Roy N. Envall, Jr.
Assistant Examiner—Steven R. Garland
Attorney, Agent, or Firm—Sughrue, Mion, Zinn, Macpeak & Seas

[57] ABSTRACT

A "programless" control method and an apparatus therefor which pre-stores the device numbers of input devices that are changed in response to the manual or external-controlled operation of a controlled object in accordance with a desired sequence control procedure. The results of the changes are stored in order in a transition condition storing table as transition conditions. Also, data input from external equipment and intended to be output to the controlled object as operation step data is pre-stored in an operation step storing table in correspondence with such transition conditions. Finally, in operation, the transition conditions are read from the transition condition storing table in storage order and they are compared with the current states of the input devices when the sequence control of the controlled object is executed. If any transition condition matches, the operation step data corresponding to said transition condition is read from the operation step storing table and is output to the controlled object. In this manner, programless sequence control can be exercised for the controlled object.

19 Claims, 7 Drawing Sheets

FIG. 4

A DATA MANAGEMENT TABLE 31A

| ADDRESS | DATA | |
|---|---|---|
| 0 | 9 | A1 |
| 1 | 0 | A2 |
| 2 | 10 | A3 |
| 3 | 0 | A4 |

B TRANSITION CONDITION STORING TABLE 31B

| ADDRESS | INFORMATION OF DEVICE BIT-FLIPPED |
|---|---|
| 10 | X004(1) |
| 11 | X002(0) |
| 12 | X003(1) |
| 13 | X000(0) |
| 14 | X001(1) |
| 15 | X001(0) |
| 16 | X000(1) |
| 17 | X003(0) |
| 18 | X002(1) |
| 19 | |
| 20 | |

C EXECUTED STEP STORING TABLE 31C

| ADDRESS | EXECUTED STEP DATA | |
|---|---|---|
| 100 | 10 | C1 |
| 101 | 1 | C2 |
| 102 | Y012(0) | C3 |
| 103 | 10 | |
| 104 | 0 | |
| 105 | Y013(1) | |
| 106 | 11 | |
| 107 | 2 | |
| 108 | Y010(0) | |
| 109 | 11 | |
| 110 | 0 | |
| 111 | Y011(1) | |
| 112 | 11 | |
| 113 | 0 | |
| 114 | Y014(1) | |
| 115 | 13 | |
| 123 | Y013(0) | |
| 124 | 15 | |
| 125 | 0 | |
| 126 | Y012(0) | |
| 127 | 15 | |
| 128 | 0 | |
| 129 | Y014(0) | |

| DEVICE NO. | EQUIPMENT NAME | FUNCTION |
|---|---|---|
| X000 | LS-R | SPINDLE UNIT REAR END |
| X001 | LS-F | SPINDLE UNIT FRONT END |
| X002 | LS-U | CLAMP TOP END |
| X003 | LS-D | CLAMP BOTTOM END |
| X004 | LS-W | WORKPIECE PRESENCE |
| Y010 | SOL-R | SPINDLE UNIT RETRACTION |
| Y011 | SOL-F | SPINDLE UNIT ADVANCE |
| Y012 | SOL-U | CLAMP UP |
| Y013 | SOL-D | CLAMP DOWN |
| Y014 | MR | SPINDLE ROTATION |

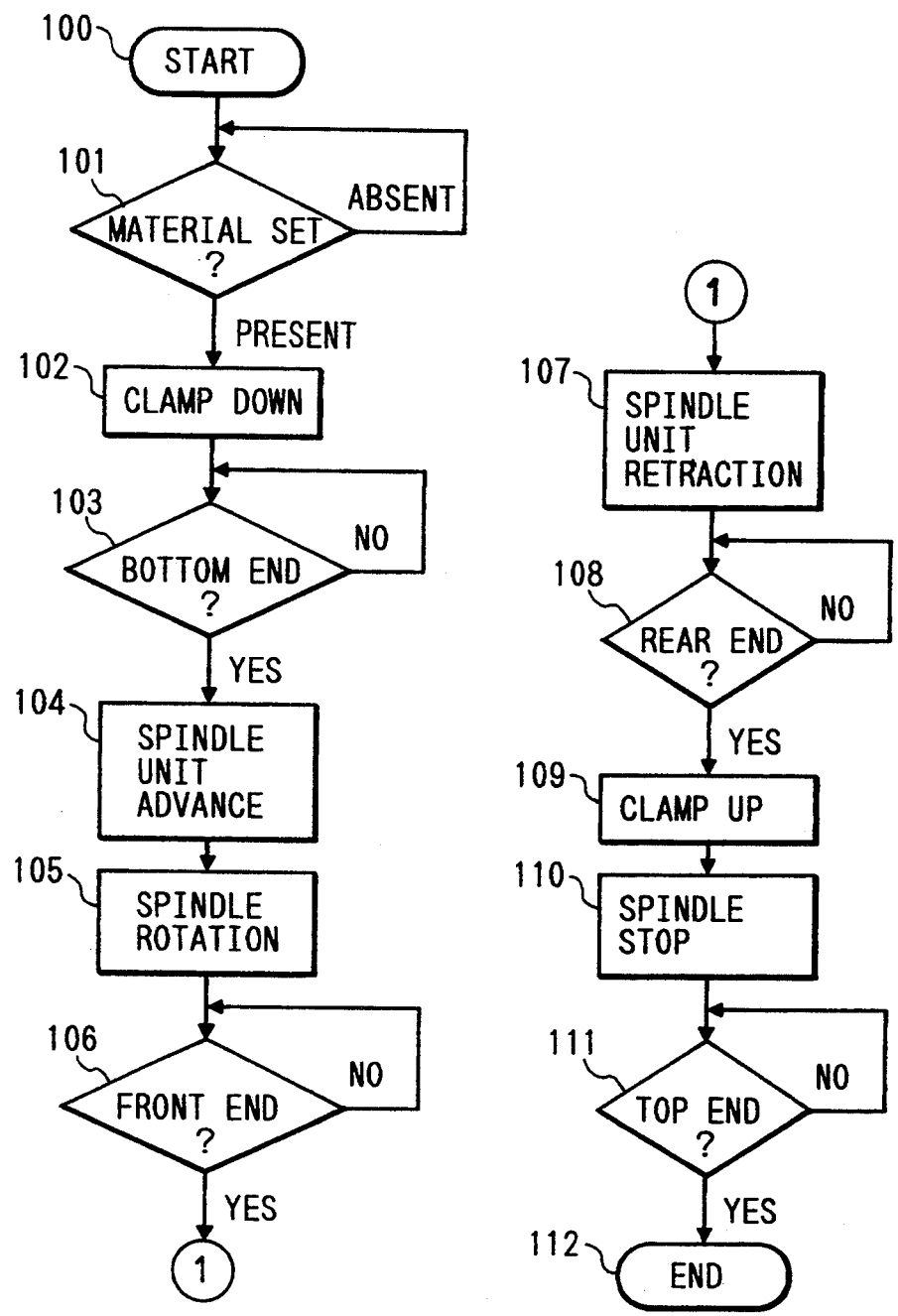

PROGRAMMABLE CONTROLLER AND CONTROL METHOD THEREOF

BACKGROUND OF THE INVENTION

1. Field of the Invention

The present invention relates to a programmable controller and a method therefor which does not require sequence control programs to be written for the sequence control of a controlled object.

2. Description of the Background Art

Programmable controllers are employed for the sequence control of a wide variety of controlled objects.

FIG. 5 illustrates the arrangement of a drilling unit for boring a hole in a workpiece as an example of a sequence control of a controlled object by means of a programmable controller known in the art. In FIG. 5, a workpiece 1 is secured in a machining position on base 4 by a clamper 2. The base 4 also has securely installed thereto a spindle unit 3 for performing a machining operation. Specifically, the spindle unit 3 is operative to drill the workpiece 1 while the workpiece 1 is set clampably on the base 4 by the clamper 2 and the spindle unit 3 advances and retracts on the base 4.

In FIG. 5, the symbol LS indicates a limit switch. Specifically, LS-R stands for a limit switch for detecting the rear end of the spindle unit 3 in a retraction position, LS-F a limit switch for detecting the front end Of the spindle unit 3 in an advance position, LS-U a limit switch for detecting the top end of the clamper 2 in a top position, LS-D a limit switch for detecting the bottom end of the clamper 2 in a bottom position, and LS-W a limit switch for detecting the placement of the workpiece 1 in a machining position. The symbol SOL indicating the direction of the clamper 2 or spindle unit 3 operation started by the activation of a solenoid valve (not shown), SOL-R represents the solenoid activated retracting direction of the spindle unit 3, SOL-F the solenoid activated advancing direction of the spindle unit 3, SOL-U the solenoid activated rising direction of the clamper 2, and SOL-D the lowering direction of the clamper 2. The symbol MR indicates the rotary operation of the spindle unit 3.

FIG. 6 is a flowchart illustrating the operation sequence of the drilling unit shown in FIG. 5. FIG. 7 illustrates an example of a program written in the SFC language for the programmable controller which controls the drilling unit shown in FIG. 5. The program example in FIG. 7, which is identical in contents to the flowchart in FIG. 6, comprises an initial step S0 that is seen as START command 100 in FIG. 6. Thereafter, the program encounters transition conditions T0 to T4, operation steps S1 to S4, and an end step END. In FIG. 7, the transition conditions T0 to T4 and the blocks S1 to S4, as the operation steps, are shown in correspondence with ladder diagrams. It should be noted that, conventionally, a sequence operation control program is created by first writing the overall structure of the program in the SFC language and then writing the block contents in the ladder language. The use of SFC language and ladder language is well known in the art.

FIG. 8 shows relationships between the input device numbers "X000" to "X004" and output device numbers "Y010" to "Y014" of the programmable controller and the equipment names assigned to those devices.

The operation of the drilling unit shown in FIG. 5 will now be described in accordance with the flowchart shown in FIG. 6. In the flowchart, the control of the drilling unit is initiated in step 100. Whether the workpiece 1 has been set on the base 4 or not is checked by the limit switch LS-W (device X004) in step 101. If the setting (presence) of the workpiece 1 has been confirmed, the clamper 2 is lowered in step 102. In step 103, it is then checked by the limit switch LS-D (device X003) whether or not the clamper 2 has reached a bottom end and completed the clamping of the workpiece 1. If the completion of the clamping has been confirmed, the spindle unit 3 is advanced toward the workpiece 1 in step 104 and the spindle is driven in step 105.

Then, after it has been confirmed in step 106 that the spindle unit 3 has reached a predetermined advance position and a drilling operation with a drill is complete by the limit switch LS-F (device X001) which checks the front end of the spindle unit 3, the spindle unit 3 is retracted in step 107. Then, after it has been confirmed in step 108 that the spindle unit has reached a predetermined retraction position by the limit switch LS-R (device X000) which checks the rear end of the spindle unit 3, the clamper 2 is raised in step 109 and the spindle is stopped in step 110. Finally, in step 111, whether or not the clamper 2 has reached a predetermined top end is checked by the limit switch LS-U (device X002). If this has been confirmed, a drilling control sequence is completed.

In the program written in the SFC language shown in FIG. 7, the steps having identical numbers to those in the flowchart in FIG. 6 indicate identical contents. It should be noted that the operation step S2 indicates the operations of the steps 104 and 105 in FIG. 6, and the operation step S4 those of the steps 109 and 110 in FIG. 6.

The relationships between the input device numbers "X000" to "X004" and output device numbers "Y010" to "Y014" and the equipment names assigned to said devices are as shown in FIG. 8. Referring to FIG. 7, when the device "X004" (LS-W) is closed at the transition condition T0 (101), i.e., limit switch LS-W confirms that the workpiece 1 has been set on the base 4, the transition condition (T0) is established and the operation step S1 (102) is executed. Namely, as seen in the ladder diagram, the device "Y012" is reset (i.e., the solenoid valve SOL-U which causes the clamper 2 to rise is reset) and the device "Y013" is set (i.e., the solenoid valve SOL-D which causes the clamper 2 to lower is set). The remainder of the program in FIG. 7, which is identical in operations to the flowchart in FIG. 6 as described previously, should be apparent and will not be described here.

Since the program control apparatus known in the art is arranged as described above, a program must be written in various programming languages for each operation control module in the sequence control of a controlled object. Also, a program requiring a complete operation sequence to be modified must be decoded entirely. Further, it is difficult to decode such program because operation control and information control generally are combined and interrelated therein.

SUMMARY OF THE INVENTION

It is accordingly an object of the present invention to overcome the disadvantages in the conventional art by providing a programless control method and an apparatus therefor which do not need a program to be written on an operation control module basis.

The invention achieves a programmable controller and its controlling method which permits the sequence control of a controlled object without needing an operator to write a program.

In accordance with the invention, the controlled object is initially moved (manually or by other, for example) in accordance with a desired sequence control procedure. During the initial movement procedure, the device numbers of input devices are subject to a binary change, or "bit-flipped", as the operation of the controlled object is conducted. The device numbers with the resultant changed bits are stored in advance into a transition condition storing table as transition conditions. Also, data to be output to the controlled object is stored beforehand as operation step data into an operation step storing table in correspondence with the transition conditions. When the sequence control of the controlled object is executed, the transition condition then is read from the transition condition storing table and is compared with the current state of the input device. On a match, the operation step data corresponding to the transition condition is read from the operation step storing table and is output to the controlled object. On the basis of the initial run of the machine, the conditions of operation are identified and stored automatically and no operator programming is required. The stored conditions may be later accessed for control of the operation of the device.

BRIEF DESCRIPTION OF THE DRAWINGS

FIG. 4 illustrates the data formats of a transition condition storing table and an operation step storing table included in a transition data storing area shown in FIG. 1.

FIG. 6 is an operation flowchart for the drilling unit shown in FIG. 5.

DESCRIPTION OF THE PREFERRED EMBODIMENTS

Figure 1:
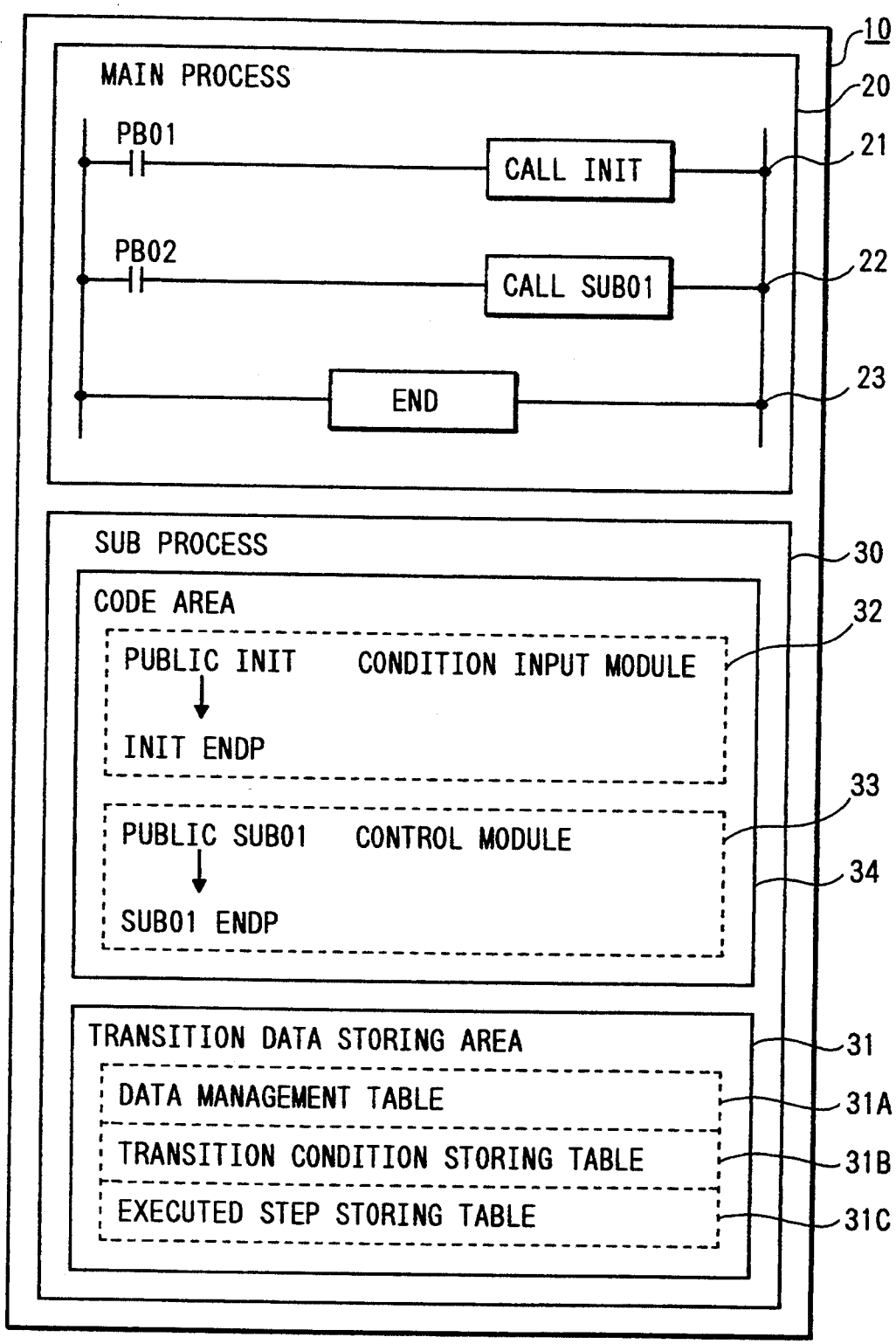
FIG. 1 illustrates the arrangement of a process section in a programmable controller acting as a programless control apparatus according to a preferred embodiment of the invention.

An embodiment of the invention will now be described with reference to FIGS. 1 to 5, wherein identical reference characters to those in the conventional art indicate identical or corresponding parts. According to the preferred embodiment, a programmable controller executes a program written in a conventional ladder language as a main process. A sub process section is accessed by a main process section but does not require a sequence control program to be written.

FIG. 1 shows the arrangement of processes in the programmable controller, i.e. the memory layout of the main process and the sub process. Referring to FIG. 1, the numeral 10 indicates a process section in the programmable controller, comprising a main process section 20 and a sub process section 30. The main process section 20 stores a program written in the ladder language and executes the program in conducting the main process. The sub process section 30 serving as a sub module comprises a transition data storing area 31, and a code area 34, which includes a condition input module 32 as a condition inputting means, and a control module 33 as a control executing means.

The transition data storing area 31 includes a data management table 31A for storing the management data of the subprocess section 30, a transition condition storing table 31B for storing transition conditions, and an operation step storing table 31C for storing operation steps.

The condition input module 32 stores the device numbers of applicable input devices in the data storing area 31. For example, "X000" to "X0004" are stored for the drilling unit shown in FIG. 5. The device number is stored as a result of the initial (e.g., manual) operation of the drilling unit in accordance with a desired sequence control procedure. The device numbers are "bit-flipped" as a result of the manual operation. Specifically, the device number bits "0" and "1" that result from a bit-flipping operation are stored in the transition condition storing table 31B in sequence as transitions. The condition input module 32 also inverts the bits "0" and "1" of output devices "Y010" to "Y014" in accordance with data output to the drilling unit. It then stores the results into the operation step storing table 31C as operation step data in correspondence with the transition conditions.

The control module 33 is accessed by the main process section 20. It reads the transition conditions stored in the transition condition storing table 31B in accordance with the address of the transition condition stored in the operation step storing table 31C. Then, it compares the stored conditions with the current state of the input devices. If any transition condition matches, the control module 33 will read the operation step data corresponding to the transition condition from the operation step storing table 31C and output it to the drilling unit.

Figure 2:
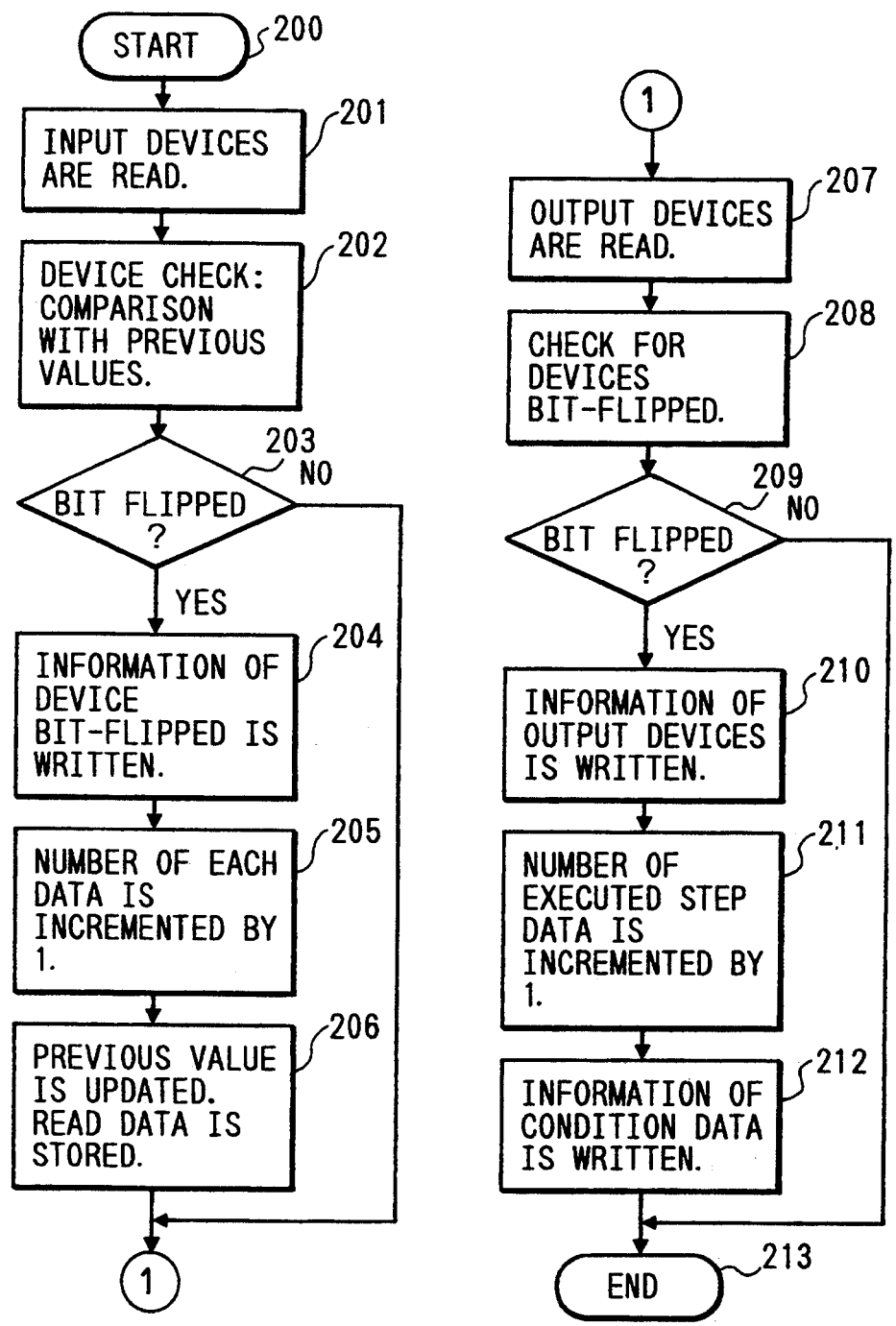
FIG. 2 illustrates a control procedure for a condition input module in a sub process section shown in FIG. 1.
Figure 3:
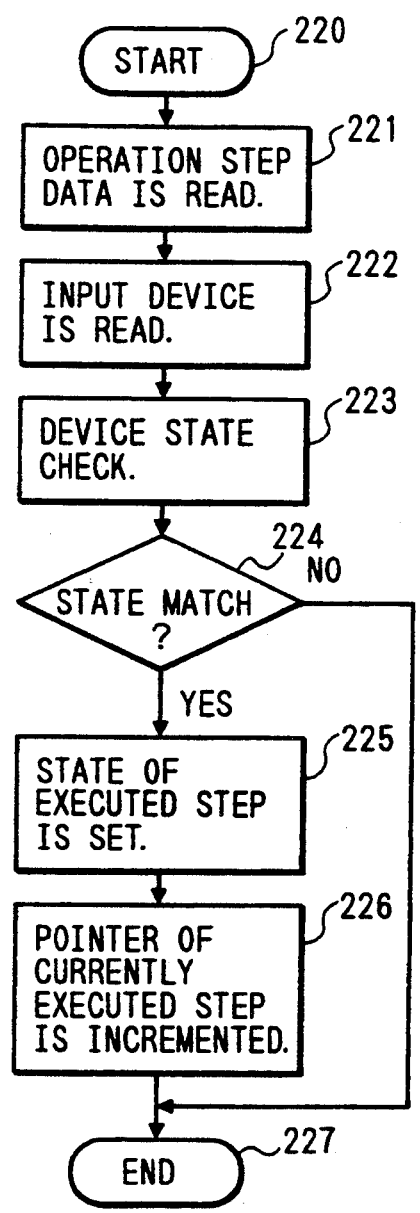
FIG. 3 illustrates a control procedure for a control module in the sub process section shown in FIG. 1.

FIG. 2 is a flowchart illustrating the control operation of the condition input module 32 in FIG. 1. FIG. 3 is a flowchart illustrating the control operation of the control module 33. FIG. 4 shows the arrangement of the data management table 31A, the transition condition storing table 31B and the operation step storing table 31C included in the transition data storing area 31. Each table comprises addresses and corresponding information concerning input devices, output devices and other relevant data to be described.

The transition condition storing table 31B sequentially stores the device numbers "X000" to "X004" of the input devices, whose contents have changed by bit-flipping the bit states "0" and "1", in the sequence of their change. Specifically, as seen in FIG. 4, in transition condition storing table 31B, as the initial sequence of the process is manually conducted, device LS-W is first operated and bit-flipping of the original device number X004(0) results in the storage of device number X004(1) at the first storage position identified by address 10. As the initial sequence proceeds, the other input devices are operated and the corresponding device numbers are stored in sequence with bit-flipping resulting in changes of "X000(0)" through "X004(1)".

The operation step storing table 31C similarly stores in sequence the device numbers of the output devices, which have been changed by bit-flipping in correspondence with the transition conditions. These output device numbers and the bit resultant states "0" and "1" are stored as operation step data, e.g., "Y010(0)" to "Y014(1)"

In the operation step storing table 31C, three pieces of data, (1) a transition condition data storing head address C1, (2) a number of transition condition data C2, and (3) data C3 indicating the output device number and resultant bit after flipping, constitute a "block". The number of transition condition data C2 indicates the number of transition conditions serving as the premises of data output from the output device. The transition condition data storing "head address" C1 indicates an address at which, if there are a plurality of transition conditions, the first number of the corresponding transition condition numbers in the transition condition storing table 31B is stored. If there is only one transition condition, C1 indicates an address at which that transition condition number is stored. In the example of FIG. 31B, the head address (C1) refers to address 10 in the transition condition table of FIG. 31B and there is only one (1) transition condition data (C2) relevant as a premise for the output from device Y012(0) at C3.

The data management table 31A stores management information employed for data transfer to and from the transition condition storing table 31B and operation step storing table 31C when a sequence of programless control is carried out by the condition input module 32 and control module 33.

Addresses "0" to "2" in the data management table 31A, as illustrated in FIG. 4, are used to write data to the tables 31B and 31C. At address "0", an accumulative number of input devices is stored and the number A1 indicates the accumulative number of bit-flipped input devices. At address "1", a number of current steps is stored with A2 indicating the accumulative number of input devices with respect to a currently executed step. At address "2", an accumulative number of output devices is stored. There, A3 indicates the accumulative number of bit-flipped output devices. Finally, at address "3", which acts as a pointer indicating an address used to read the table 31C, an accumulative number of currently executed steps that previously were read from the table 31C is stored. Its initial value indicates the head address of the first data block in the table 31C.

The operation of the programmable controller acting as a programless control apparatus for controlling the drilling unit shown in FIG. 5 will now be described with reference to FIGS. 1 to 4.

Referring now to FIG. 1, when a program step "CALL INIT" written in the ladder language is executed in the main process section 20, the condition input module 32 in the sub process section 30 is activated.

Figures 5, 8:
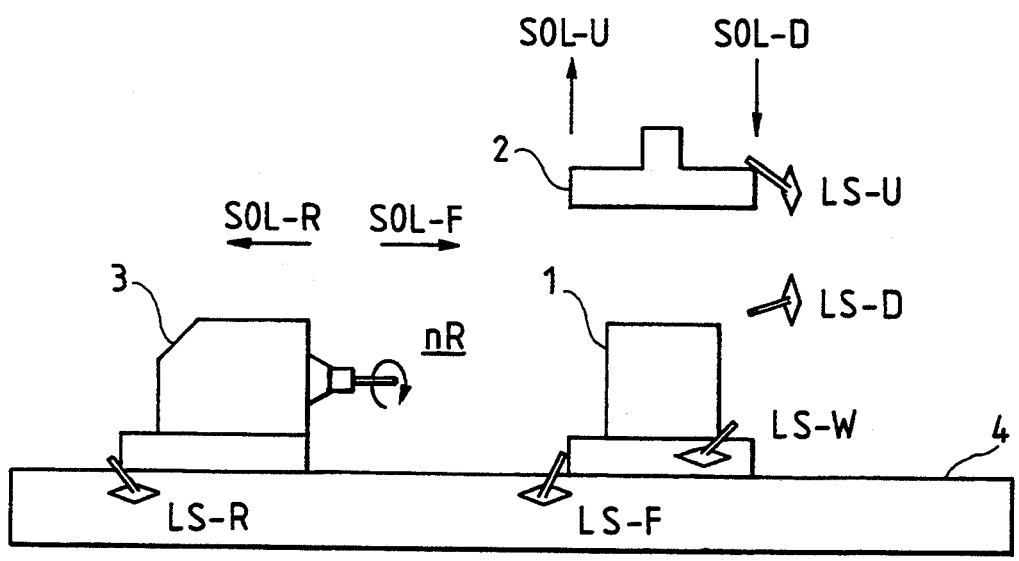
FIG. 5 illustrates the arrangement of a conventional drilling unit that would be controlled conventionally and in accordance with the preferred embodiment of the invention.
FIG. 8 illustrates relationships between the input and output device numbers of the known programmable controller and equipment constituting the drilling unit shown in FIG. 5.
Figure 7:
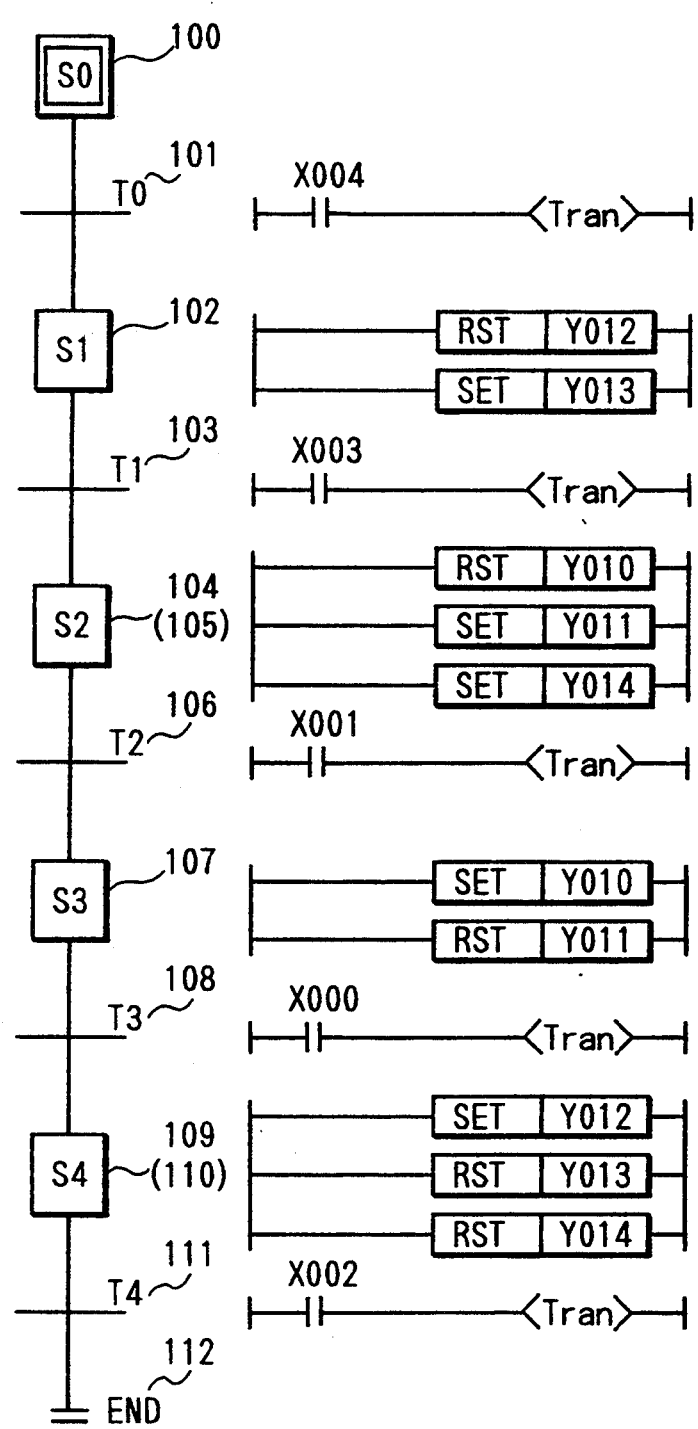
FIG. 7 illustrates a program written in the SFC language for a programmable controller known in the art.

At this point, the drilling unit shown in FIG. 5, for example, is operated manually in the sequence shown in the flowchart of FIG. 6. As a result, the condition input module 32 will store the data concerning the input devices that correspond to the five limit switches (LS-R, LS-F, LS-U, LS-D and LS-W) in response to the operations of the limit switches. Specifically, with respect to the present example, the device numbers of the input devices "X000" to "X0004" whose bit states have changed by bit-flipping, as well as the change to their bit states "0" and "1", are stored into the transition condition storing table of the transition data storing area 31. The storage is made in accordance with the sequence of the bit-flipping changes, i.e., first X004 representing operation of LS-W, then X002 representing operation of LS-U, etc. The stored contents are managed as transition conditions.

The operation will now be described with reference to the flowchart shown in FIG. 2. At step 200 in FIG. 2, the execution of "CALL INIT" in the main process section 20 causes the subprocess section to initiate a control operation. The condition input module 32 reads all input devices at step 201, compares the current bits of the input devices with their previous values (with initial values in this case since this is the first comparison) at steps 202 and 203, and stores the device numbers and bits of the input devices bit-flipped into the transition condition storing table 31B at step 204. At the same time, the condition input module 32 increments the accumulative number of input steps stored at A1 indicating the accumulative number of input devices bit-flipped and increments the number of current steps stored at A2 indicating the accumulative number of input devices with respect to the current step in the data management table 31A at step 205, and stores all the read input devices as the ones of which preceding values have been updated at step 206.

Namely, with reference to FIG. 5, when the workpiece 1 is set on the base 4, the limit switch LS-W is "closed", the bit state of the input device "X004" is flipped from "0" to "1". Therefore, at step 204, the condition input module 32 stores the input device number and the changed bit in the transition condition storing table 31B in the format of "X004(1)", as seen in FIG. 4. At step 205, the condition input module 32 also increments the initial value "0" representing the accumulative number of input devices (stored at A1) and increments the number of current steps (stored at A2) within the data management table 31A ("0" in this case).

The condition input module 32 then reads all the output devices at step 207, compares the bits of the output devices with their previous values (with initial values in this case since this is the first comparison) at step 208. A check for bit-flipping is made at step 209. If no flip has occurred, the process moves to the end at step 213, but if a change in bit is detected, the input module stores the device numbers and bits of the output devices bit-flipped into the operation step storing table 31C at step 210. The condition input module 32 also increments the accumulative number of output steps stored at A3 in the data management table 31A at step 211. It also stores all the read output devices as the ones of which preceding values have been updated at step 212. Finally, it will transfer control to the main process section 20 at step 213.

As a specific example with respect to FIG. 5, when the clamper 2 is lowered as a result of the operation of SOL-D, the bit of the output device "Y012" is inverted from "1" to "0" (because previously operative SOL-U is made inoperative or "reset") and that of the output device "Y013" is inverted from "0" to "1" (because SOL-D is made operative or "set"). Therefore, when the condition input module 32 reads all of the output devices at step 207 and compares the current bit values to the previous bit values for each device at step 208, it will determine that there are flipped bits of the two output devices at step 209. Module 32 then stores "Y012(0)" as the device number and current bit of the first output device bit-flipped at C3 of block 1. It also stores "10" as the transition condition data storing head address at C1, and "1" as the number of transition condition data C2 in the operation step storing table 31C at step 210.

The transition condition data storing head address C1 is an address value indicating where the corresponding transition condition number is stored in the transition condition storing table 31B. Head address C1 is found from a difference between the total number of input devices stored A1 and the number of current steps stored A2 in the data management table 31A. The number of current steps that would be stored at A2 (which is "1" in this case) in the data management table 31A is then transferred to the number of transition condition data C2, and the number of current steps stored at A2 is set to "0".

Then, in the same way as described above, the condition input module 32 stores "Y013(1)" as the device number and output state C3 of the device bit-flipped "Y013". The number "10" is stored as the transition condition data storing head address C1, and "0" is stored as the number of transition condition data C2. Since the number of current steps stored at A2 in the data management table 31A is "0", this "0" is transferred as the number of transition condition data C2. Also, "10", which is the same value as before is transferred as the transition condition data storing head address C1.

Now, in view of the states of the input devices, immediately before the clamper 2 starts lowering, the limit switch LS-U is in a "closed" state, i.e. the bit of the input device "X002" is "1". When the clamper 2 starts lowering, the LS-U changes from the "closed" to an "open" state and the bit of the input device "X002" is also inverted from "1" to "0". When the clamper 2 then reaches and clamps the workpiece 1 on the base 4, the limit switch LS-D changes from the "open" to the "closed" state and the bit of the input device "X003" is inverted from "0" to "1". The condition input module 32 retrieves these changes and stores the input device numbers and bits, "X002(0)" and "X003(1)", into the transition condition data table 31B. The accumulative number of input devices stored at A1 in the data management table 31A is incremented to "3" and the number of current conditions stored at A2 is incremented to "2".

Hereafter, in a similar manner, the sequence in FIG. 2 is repeated in accordance with the flowchart shown in FIG. 3, whereby the data management table 31A, the transition condition storing table 31B and the operation step storing table 31C shown in FIG. 4 are completed. As seen in table 31A, after an initial run, the number of accumulated input steps at A1 and the number of accumulated output steps at A3 represent the number of changes to such devices that are to occur during an actual run of the process. The number of current steps at A2 would be "0" since, with the completion of the input process as noted above, all transfers to tables 31B and 31C have occurred.

Now, when a program step "CALL SUB01" written in the ladder language is executed in the main process section 20 shown in FIG. 1, the control module 33 in the sub process section 30 is activated to start control in accordance with the transition conditions stored in the transition condition storing table of the transition data storing area 31 and the operation steps stored in the operation step storing table. The control procedure of the control module 33 will now be described with reference to the flowchart shown in FIG. 3.

Referring now to the flowchart shown in FIG. 3, the first operation step data stored in the operation step storing table 31C in FIG. 4 is read at step 221, the transition condition stored in the transition condition storing table 31B is read on the basis of the transition condition storing address stored in the operation step storing table 31C at step 222, and is compared with the current bit of the input device at steps 223 and 224. Specifically, with reference to the condition illustrated in FIG. 4, block 1 is accessed and the address "10" at C1 is identified as the location of the first input device data for comparison. The stored device data and its bit are used for comparison of the current state of the same device and its current bit.

A match is regarded as "transition condition established". When the match occurs, the operation step corresponding to said transition condition stored in the operation step storing table is executed and the executed data is output to the drilling unit at step 225. Also, the value of the accumulative number of currently executed steps A4 in the data management table 31A is incremented at step 226 to move the pointer to the next step, and control is transferred to the main process section 20 at step 227. If the transition condition is not established at step 224, the execution of sub process control is completed and control is transferred to the main process section 20 at step 227.

That is, the currently executed step data A4 in the data management table 31A shown in FIG. 4 indicates the pointer of a step executed in the operation step storing table 31C. The initial value (here "0") indicates the first address (here "100") in the operation step storing table 31C. As a result, based on the pointer value at A4, the transition condition head address "10" and the number of data "1" stored at the head address are read at step 221. Then, the combination of transition condition device number and bit "X004(1)" stored in the transition condition storing table 31B are read at step 222 on the basis of the transition condition head address "10" read at step 221.

Then, the bit reflecting the current state of the input device LS-W corresponding to the device number "X004" read at step 222 is compared with the bit read at step 223. If the transition condition is established, the operation step device "Y012(0)" is read and executed at step 225.

After the execution, the currently executed step data A4 is incremented at step 226, thereby incrementing the pointer address, and control is returned to the main process section 20 in FIG. 1 at step 227. If the comparison results in unestablished transition condition, the currently executed step is left intact, control is returned to the main process section, and the control of the main process section is resumed. The above control is repeated to exercise "programless control" by a programmable controller.

To alter part of the sequence operation, an operation alteration mode is provided. In the operation alteration mode, a single-step execution function is provided to perform the operation up to the operation step to be altered. Here, transition condition data is added to the transition condition storing table 31B in FIG. 4 using the condition input module 32, and if identical data is output, it is judged that only the transition condition is altered and the transition condition address C1 and the number of transition condition data C2 in the operation step storing table 31C are altered.

Now, to insert an operation step to the sequence operation, the operation is performed in a similar manner up to an operation step, where a new operation step is to be inserted, by the single-step execution function. Here, the condition input module 32 is executed to add new transition condition data to the transition condition storing table 31B. If the output device to be executed does not match the current data, it is determined that there is a step to be inserted. Then, the data of the currently executed step in the operation step storing table 31C is shifted down, and a new operation step is stored to this area.

In the disclosed embodiment, when the condition input module 32 is activated to obtain the transition conditions, the input device numbers corresponding to the limit switches activated by the manual operation of the drilling unit and their resultant bits are stored into the transition condition storing table in the order of the bit flipping. Alternatively, the input devices may be forced to be bit-flipped by a peripheral apparatus without the drilling unit being operated manually, and the device numbers and their resultant bits may be stored into the transition condition storing table.

It will be apparent that the invention, as described above, achieves a "programless" control method and an apparatus therefor which pre-stores the device numbers of input devices that have changed in response to the operation of a controlled object performed in accordance with a sequence control procedure and the results of said changes in order in a transition condition storing table as transition conditions. It also pre-stores data input from external equipment and to be output to said controlled object as operation step data in an operation step storing table in correspondence with such transition conditions. Finally, in operation, it reads the transition conditions from the transition condition storing table in storage order and compares them with the current states of the input devices when the sequence control of the controlled object is executed, and if any transition condition matches, reads the operation step data corresponding to said transition condition from said operation step storing table and outputs it to said controlled object, whereby programless sequence control can be exercised for the controlled object.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A method of controlling an object, including a main process for exercising the program control of said controlled object and a sub process for carrying out the automatic control thereof when executed, by programless establishment and operation of said sub process and in conjunction with input devices and output devices having respective device numbers, comprising the steps of:

operating said controlled object in accordance with a desired sequence control procedure and storing the device numbers of said input devices that have changed and bits which have changed as a result of the changed input devices in a storage order as transition conditions;

inputting data to be output to said controlled object from external equipment and storing said data as operation step data in correspondence with said transition conditions;

reading said stored transition conditions in storage order;

comparing said read transition conditions with the current states of said input devices; and if any of said transition conditions matches any of said input device current states, reading said stored operation step data corresponding to said transition condition and outputting said data to said controlled object.

2. An object control method, as set forth in claim 1, wherein said operating step is conducted manually.

3. An object control method, as set forth in claim 1, further comprising the step of detecting the states of said input devices prior to said comparing step.

4. An object control method, as set forth in claim 1, wherein said reading step is conducted following access by said main process.

5. An object control method, as set forth in claim 1, further comprising the steps of storing said output device numbers together with the results of changes in said output devices during said operating step.

6. An object control method, as set forth in claim 1, further comprising storing an accumulative number of input devices flipped.

7. An object control method, as set forth in claim 5, further comprising storing the accumulative number of output devices stored.

8. An object control method, as set forth in claim 1, further comprising:

at least one of altering and inserting transition condition data.

9. An object control method, as set forth in claim 8, further comprising:

providing an execution function for performing the operation up to a desired operation step to be altered;

adding transition condition data to said storage to alter said step;

determining whether the data for the output device to be executed as a result of said desired operation step matches the device data for said added transition condition data; and if said device data does match, altering only said transition condition data.

10. An object control method, as set forth in claim 8, further comprising:

providing an execution function for performing the operation up to a selected operation step to be followed by a new step;

adding transition condition data to said storage to insert said new step;

determining whether the device data for the output device to be executed as a result of said selected operation step matches the device data for the output device for said new step; and if said device data does not match, inserting said transition condition data.

11. A programmable controller controlling method for exercising the control of a control module by means of a sub process section under the command of a main process section which program-controls the operation of a controlled object, said operation resulting in changes to the status of input devices having corresponding device numbers and at least one status bit, comprising the steps of:

inputting data for said controlled object in accordance with a desired procedure;

bit-flipping the status bit of input devices as their status changes with operation of said controlled object;

storing said device numbers of input devices that have had their status changed and said bit-flipped status bit into a transition condition storing table in a storage order as transition conditions;

storing data to be output to said controlled object into an operation step storing table as operation step data in correspondence with said transition conditions;

reading said transition conditions stored in said transition condition storing table in said storage order;

comparing said read conditions with the current state of said input devices; and if said transition condition matches the current state of said input device, reading the operation step data corresponding to said transition condition from said operation step storing table and outputting said data to control said controlled object.

12. The programmable controller controlling method as set forth in claim 11, wherein said inputting step comprises manually operating said object to be controlled in accordance with a desired procedure.

13. The programmable controller controlling method as set forth in claim 11, wherein said inputting step comprises inputting bit-flipping data representing an operation of said object to be controlled in accordance with a desired procedure.

14. A programless control apparatus including a main process section for exercising control of a controlled object and a sub process section for carrying out the programless control thereof, said sub process section comprising:

a transition condition storing means for storing transition conditions;

an operation step storing means for storing operation data, corresponding to the transition conditions, to be output to said controlled object;

condition inputting means for storing in an order of generation (i) the device numbers of input devices that have changed in response to the operation of said controlled object in accordance with a desired sequence control procedure and (ii) the results of said changes, into a transition condition storing table as transition conditions; and programless control means accessed by said main process section for reading said transition conditions stored in said transition condition storing means in storage order, comparing said read conditions with the current states of said input devices, and if any of said transition conditions matches any of said input device current states, reading the operation step data corresponding to said matching transition condition from said operation step storing means and outputting said data to said controlled object.

15. A programless control apparatus, as set forth in claim 14, wherein said transition condition storing means and said operation step storing means further comprise means for storing input and output device numbers, respectively, together with the results of changes in said devices during an operating procedure.

16. A programless control apparatus, as set forth in claim 15, further comprising means for storing the accumulative number of input devices stored.

17. A programless control apparatus, as set forth in claim 15, further comprising means for storing the accumulative number of output devices stored.

18. A programless control apparatus, as set forth in claim 14, further comprising:

means for performing a single step execution function for at least one of altering and inserting transition condition data.

19. A programless control apparatus, as set forth in claim 15, further comprising data management storage means for storing address data pointing to an area in said operation step storing means for access in response to a transition condition in said transition condition storing means.

* * * * *